April 17, 1934.  E. M. FRASER  1,954,809
ELECTROMAGNETIC BRAKE
Filed May 20, 1932  2 Sheets-Sheet 1
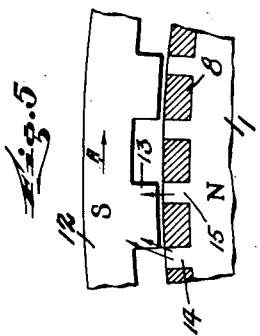
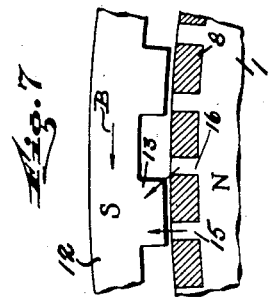
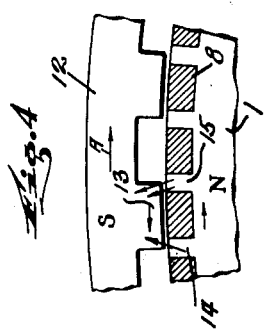
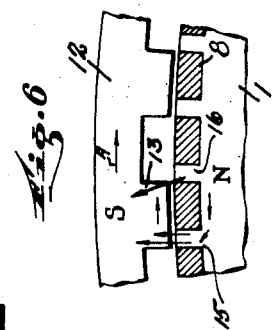
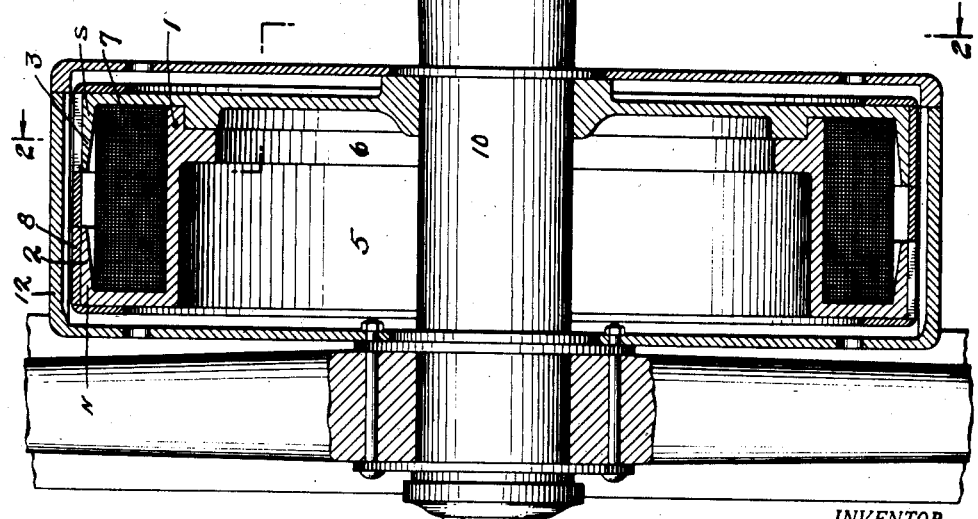
INVENTOR.
ETHELBERT M. FRASER
BY
ATTORNEYS.

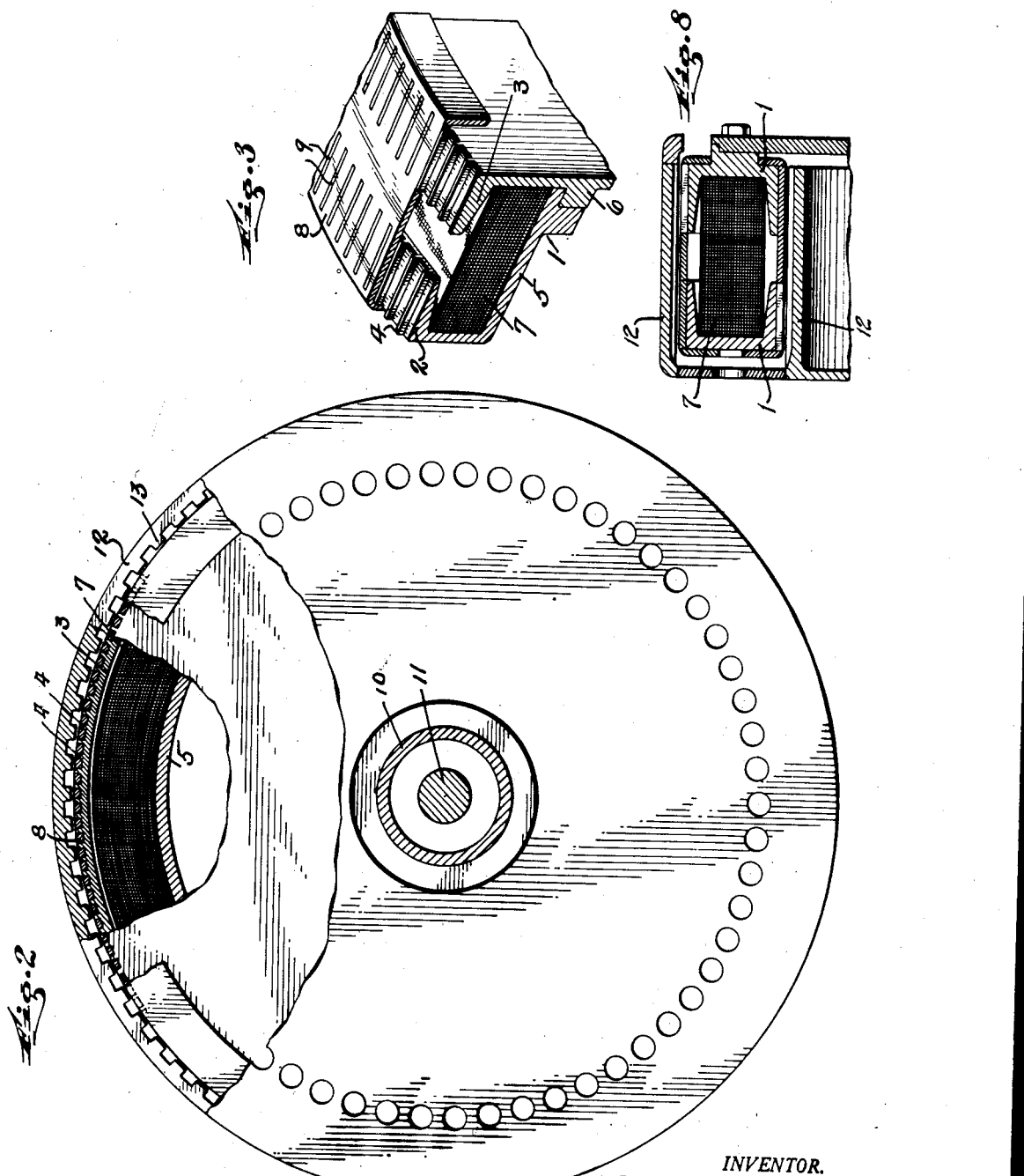

Patented Apr. 17, 1934

1,954,809

UNITED STATES PATENT OFFICE 1,954,809

ELECTROMAGNETIC BRAKE

Ethelbert M. Fraser, Yonkers, N. Y.

Application May 20, 1932, Serial No. 612,514

10 Claims. (Cl. 188—104)

My invention is directed to an improvment in brakes, and has for one of its objects the provision of an electromagnetic brake comprising a magnet and an exciting coil together with a magnetic armature for said magnet, my improved construction being such that the reluctance of the main magnetic circuit remains constant.

A further object of my invention is the provision of a brake of the character indicated in which provision is made for not only bringing the moving part to rest but for maintaining the same stationary.

In use, as will be brought out hereinafter, one part of the brake will be fixed to a stationary part of the apparatus to which it is applied, the other part of the brake being fixed to the moving part. As above mentioned a single winding is employed for exciting the magnet forming part of the brake and it is to be understood that the current to this winding will be controlled by any suitable device whereby the current supplied to the winding can be varied at will.

My improved braking mechanism is of such construction that movement of one member of the brake relatively to the other member will be opposed, whether the parts are in motion or stationary.

In the drawings:

Fig. 1 is a sectional elevational view showing my improved construction;

Fig. 2 is a view on the line 2—2 of Fig. 1;

Fig. 3 is a perspective view of a part of my improved construction;

Figs. 4 to 7, inclusive, are more or less diagrammatic views provided for purposes of clarity of description; and Fig. 8 is a modification.

Referring to the drawings in detail and first of all to Figs. 1, 2 and 3, it will be seen from these figures that in the embodiment illustrated my improved brake comprises a single circular magnet designated 1, the poles 2 and 3 of which are serrated or toothed, the teeth having been designated 4. The frame of the magnet 1 is made in two sections 5 and 6 so constructed as to permit of assembling of the magnet with the energizing coil 7, the latter being energized from any suitable source of power.

Completely surrounding the poles of the magnet 1 is a copper grid 8 slotted as shown at 9, the grid, as will be understood, filling the spaces between the teeth 4 in the faces of the poles 2 and 3 of the magnet.

In the construction illustrated the magnet 1 is attached by any suitable means to the stationary housing 10 of member 11.

The magnet structure above described is completely surounded by a yoke or armature 12 slotted on the inside to provide teeth 13, this armature as will be understood serving to complete the magnetic circuit of the apparatus.

The yoke or armature, in the embodiment illustrated, is attached to the moving or driven member so that we have a construction in which the magnet is fixed while the armature is movable relatively thereto. It is to be fully understood that these two members may be reversed so far as capability of movement is concerned, the essential being merely that one part shall be movable and the other stationary.

The number of teeth 4 in the faces of the poles 2 and 3 of the magnet 1 is a multiple of the number of teeth 13 in the magnet armature 12 and the width of each tooth of the armature is at least the width of the pitch line of any two adjacent teeth on the magnet, so that in every position of the armature 12 the teeth 13 therein will be staggered or offset with respect to the teeth 4 in the faces 2 and 3 of the magnet poles. As illustrated the magnet 1 has twice as many teeth as the armature.

In operation current is supplied to the coil 7 and the circular magnet 1 is excited magnetically forming an S pole on the right outside pole in Fig. 1 and an N pole on the left outside pole of the circular magnet of the same figure. In order to complete the magnetic circuit, magnetic lines must flow from the teeth 4 of the left pole, as viewed in Fig. 1, to the teeth 13 on the armature 12 and from the teeth 13 to the teeth 4 on the right pole of the magnet, as viewed in Fig. 1. The number of magnetic lines flowing between the teeth vary in direction and amount when the brake is functioning but the number of lines and direction of flow remain substantially constant in the frame of the magnet.

Referring more particularly to Figs. 4, 5 and 6 we will assume that the armature 12 is moving in the direction of the arrow A thereon. In Fig. 4 the flux passing through tooth 14 is decreasing while the flux passing through the tooth 15 is increasing. It will be understood of course that these teeth 14 and 15 correspond to adjacent teeth 4 on the faces of the poles of the magnet 1. Consequently a current is induced in the copper of the grid 8 surrounding these teeth to increase the ampere turns around the tooth 14, which in turn tends to maintain the flux passing between the tooth 14 and the tooth 13 of the armature.

Similarly the increasing flux passing from tooth 15 to tooth 13 causes a current to be induced in the copper of the grid 8 which current is of such direction that the ampere turns created oppose the magnetomotive force of the main coil 7 so as to reduce the flux passing from the tooth 15 to the tooth 13. Under some conditions and when the braking effect is strong no flux will flow from tooth 15 to tooth 13.

As the continued movement of the armature 12 stretches the concentrated lines passing from tooth 14 to tooth 13 a retarding or braking force is exerted on the armature. It will be understood that the action above described takes place completely around the magnet, the braking effect of the apparatus being thus multiplied by the number of teeth involved.

In Fig. 5 the armature 12 is advanced with respect to its position in Fig. 4 and there is no change in the number of lines passing from tooth 15 to tooth 13 and hence no current is induced in the copper of the grid 8 surrounding the tooth 15. A very few lines, tending to retard the armature 12, pass from tooth 14 to tooth 13, and a slight current is induced in the copper of the grid 8 surrounding the tooth 14.

In Fig. 6 the tooth 13 of armature 12 is just approaching the tooth 16 of the magnet pole, the tooth 16 being the next tooth adjacent tooth 15, as will be understood, and the reluctance between tooth 13 and tooth 16 is decreasing, and a current is induced in the copper of the grid 8 surrounding the tooth 16 which "bucks" the coil 7, and the teeth 16 although attached to and a part of the N pole of the main magnet 1 will then become a small S pole and retard or repel the tooth 13 of the armature 12 to oppose the motion of the armature and cause a braking effect.

It will be seen, therefore, that the teeth 4 on the pole pieces of the magnet 1 and the teeth 13 on the inside of the armature 12, in conjunction with the copper of the grid 8, form a multiplicity of magnets whose polarity always creates a force to brake the armature 12.

In Fig. 7 the armature 12 is assumed to be stationary and resisting a force acting in the direction of the arrow B thereon. In this position the lines of force passing from tooth 16 to tooth 13 are at an angle to the direction of pull, and the resultant radial as well as circumferential pull on the armature 12 opposes the movement of the armature in the direction of the arrow B thereon, this resultant force as will be appreciated being exerted in every second tooth on the face of the magnet 1, the intermediate teeth 15 located as 15 to 13 having radial pull only.

It will be seen from the foregoing that the teeth 4 on the poles of the magnet 1 and the teeth 13 on the armature 12 are so arranged that the reluctance of the main magnetic circuit of the device remains substantially constant. It will be appreciated also that the size and spacing of the teeth are a factor of the total magnetic flux.

I wish to point out also that by reason of the provision of the toothed poles of the magnet and the toothed armature, the main magnetic flux of the apparatus has a multiplicity of small magnetic fluxes superimposed upon it without however varying the density of quantity of the main magnetic flux and that these superimposed fluxes are of such polarities in the stationary and movable members that said polarities will always oppose relative movement between the armature 12 and the magnet 1 whether the armature is in motion or stationary.

In Fig. 8 I have shown a construction particularly well adapted for use in braking heavy loads. In this construction the circular magnet 1 has a double set of poles and I provide two armatures 12 to be attached to the moving part instead of the single armature of the embodiment of my invention above described. The action of this embodiment of my invention is the same as that in Figs. 1 and 2 except that the braking action is doubled.

What I claim is:—

1. An electromagnetic brake comprising in combination a magnet with toothed poles, a toothed magnetic armature for said magnet, one of said members being rotatable relatively to the other, the number of teeth on one of said members being a multiple of the number of teeth on the other of said members, and a single winding for said magnet.

2. An electromagnetic brake comprising in combination a magnet with toothed poles, a toothed magnet armature for said magnet, one of said members being rotatable relatively to the other, one member having twice as many teeth as the other member.

3. An electromagnetic brake comprising in combination a magnet with toothed poles, a toothed magnet armature for said magnet, one of said members being rotatable with respect to the other, the width of each tooth on the armature being at least the width of the pitch of two teeth on the magnet poles, and a single winding for said magnet.

4. An electromagnetic brake comprising in combination a magnet having a plurality of poles the face of each of which is toothed, a toothed magnetic armature for said magnet, one of said members being rotatable relatively to the other, the number of teeth in the magnet pole faces being a multiple of the number of teeth in said armature, and a single energizing winding for said magnet.

5. An electromagnetic brake comprising in combination a single circular magnet having a plurality of poles the face of each of which is toothed, a toothed magnetic armature for said magnet, a single winding for said magnet, one of said members being rotatable relatively to the other, the number of teeth on one of said members being a multiple of the number of teeth on the other of said members and said teeth being so arranged that the reluctance of the main magnetic circuit is substantially constant.

6. An electromagnetic brake comprising in combination a single circular fixed magnet with toothed poles, a toothed magnetic armature for said magnet, said armature being rotatable relatively to the said magnet, the number of teeth on one of said members being twice the number of teeth on the other of said members.

7. An electromagnetic brake comprising in combination a single circular magnet with toothed poles, a toothed magnetic armature for said magnet, one of said members being rotatable relatively to the other, the number of teeth on one of said members being a multiple of the number of teeth on the other of said members, and a single winding for said magnet.

8. An electromagnetic brake comprising in combination a fixed circular magnet with toothed poles, a single winding for said magnet, a copper grid overlying said toothed poles and filling the spaces between the teeth of said poles, a rotatable toothed magnetic armature for said magnet, the number of teeth on the magnet being a multiple of the number of teeth on the armature.

9. An electromagnetic brake comprising in combination a single circular magnet with toothed poles, a single winding for said magnet and supported thereby, a copper grid surrounding said magnet and filling the spaces between the teeth and the poles thereof, a rotatable circular armature surrounding said magnet and grid and provided with teeth on its interior cooperating with the teeth on the poles of the magnet, the teeth of the armature in every position of the armature being staggered with respect to the teeth of the poles of the magnet.

10. An electromagnetic brake comprising in combination a single circular magnet with a double set of poles, said poles being toothed or serrated, a single coil for said magnet, and two rotatable circular armatures for said magnet, each armature being toothed and one armature cooperating with one set of the magnet poles, the other cooperating with the other set of magnet poles, and the number of teeth in each set of magnet poles being twice the number of teeth in the cooperating armature.

ETHELBERT M. FRASER.